(12) United States Patent
Lin

(10) Patent No.: US 8,533,573 B2
(45) Date of Patent: Sep. 10, 2013

(54) ERROR CORRECTION CIRCUIT AND METHOD THEREOF

(75) Inventor: Tzuo-Bo Lin, Tai Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1146 days.

(21) Appl. No.: 12/051,641

(22) Filed: Mar. 19, 2008

(65) Prior Publication Data

US 2008/0235551 A1    Sep. 25, 2008

(30) Foreign Application Priority Data

Mar. 22, 2007  (TW) .............................. 96109829 A

(51) Int. Cl.
*H03M 13/00*  (2006.01)

(52) U.S. Cl.
USPC ......................................................... 714/774

(58) Field of Classification Search
USPC ......................................................... 714/774
See application file for complete search history.

(56) References Cited

U.S. PATENT DOCUMENTS

| | | | |
|---|---|---|---|
| 6,182,264 B1 * | 1/2001 | Ott .................................. | 714/774 |
| 6,332,207 B1 * | 12/2001 | Southerland et al. .......... | 714/763 |
| 6,735,735 B1 * | 5/2004 | Ohira et al. .................... | 714/776 |
| 2003/0056168 A1 * | 3/2003 | Krishnamachari ........... | 714/774 |
| 2004/0240599 A1 | 12/2004 | Takasoh | |
| 2005/0091051 A1 * | 4/2005 | Moriya et al. ................. | 704/229 |
| 2005/0149814 A1 * | 7/2005 | Agazzi et al. ................. | 714/746 |
| 2006/0072926 A1 * | 4/2006 | Fukumitsu ..................... | 398/202 |
| 2006/0233230 A1 | 10/2006 | Sato | |
| 2007/0156725 A1 * | 7/2007 | Ehret et al. ..................... | 707/100 |
| 2007/0260965 A1 * | 11/2007 | Schmidt et al. ................ | 714/799 |
| 2007/0273787 A1 * | 11/2007 | Ogino et al. ................... | 348/441 |
| 2008/0079462 A1 * | 4/2008 | Chiu et al. ...................... | 326/115 |
| 2008/0172501 A1 * | 7/2008 | Goodart et al. ................. | 710/33 |
| 2008/0195923 A1 * | 8/2008 | Masumori ...................... | 714/821 |
| 2008/0204285 A1 * | 8/2008 | Carter et al. .................... | 341/67 |
| 2008/0238489 A1 * | 10/2008 | Sanduleanu et al. ........... | 327/42 |
| 2008/0253011 A1 * | 10/2008 | Mouri et al. .................... | 360/39 |

FOREIGN PATENT DOCUMENTS

| | | |
|---|---|---|
| CN | 1304609 A | 7/2001 |
| EP | 1753157 A1 * | 4/2007 |
| WO | WO 2007/120336 A2 | 10/2007 |

OTHER PUBLICATIONS

A. Kobayashi, "DisplayPort Technical Overview", 12.3.

* cited by examiner

*Primary Examiner* — James Kramer
*Assistant Examiner* — Neil Miles
(74) *Attorney, Agent, or Firm* — Birch, Stewart, Kolasch & Birch, LLP

(57) ABSTRACT

An error correction circuit and method applicable to a DisplayPort receiver is disclosed. While decoding errors occur at a decoding stage, the invention actively adjusts settings of a physical layer by using an ANSI10B/8B decoder and performs data recovery by using a correcting unit that improves the reliability of input data.

24 Claims, 6 Drawing Sheets

ERROR CORRECTION CIRCUIT AND METHOD THEREOF

This application claims priority of Application No. 096109829 filed in Taiwan, R.O.C. on Mar. 22, 2007 under 35 USC §119, the entire contents of which are hereby incorporated by reference.

BACKGROUND OF THE INVENTION

1. Field of the Invention

The invention relates to an error correction circuit and method, and particularly to an error correction circuit and method for a DisplayPort receiver in order to improve the reliability of input data.

2. Description of the Related Art

DisplayPort is a new digital display interface standard put forth by the Video Electronics Standard Association (VESA), including a Main Link, an auxiliary channel (AUX CH), and a hot plug detect (HPD) signal line. Main Link is a high-bandwidth, low-latency, uni-directional interface used for transport of isochronous streams. The number of lanes of Main Link can be either 1, 2, or 4 lanes, providing digital video and audio for simultaneous streaming transmission. Each lane supports transmission at two link rates ($F_{link}$): 1.62 Gbps or 2.7 Gbps per lane. Therefore, DisplayPort offers up to 10.8 Gbps of bandwidth.

A DisplayPort transmitter uses a PCI-EXPRESS-like link to send send image data and audio data together with a high speed link clock (having the link rates $F_{link}$) and encodes 8-bit data signals and 8-bit control signals into 10-bit dc-balanced signals by a ANSI 8B/10B encoder. Reversely, a displayPort receiver uses a decoder to recover the 8-bit data signal and the 8-bit control signal. However, poor channel quality may result in erroneous received signals. Under such circumstances, corresponding original values are not found correctly at a decoding stage, making subsequent data to be determined incorrectly.

FIG. 1 is an example showing a main video stream data packing over 4-lane Main Link. Referring to FIG. 1, Main Link consists of four lanes $L_0$~$L_3$. In terms of each of the four lanes $L_0$~$L_3$, a video data area follows a blanking end (BE) signal, whereas a blanking start (BS) signal is inserted immediately after the video data area. Further, a VB-ID signal, a video time stamp value $M_{vid}$ 7:0, an audio time stamp value $M_{aud}$ 7:0 and audio data are inserted between the signals BS and BE. Errors generated in the video data area may cause incorrect pixel values displayed in a frame. If an error is included in one of the control signals such as the signals BS, BE and VB-ID, several important image control signals such as a vertical synchronization (VS) signal and a horizontal synchronization (HS) signal may not be constructed correctly in the receivers.

SUMMARY OF THE INVENTION

In view of the above-mentioned problems, an object of the invention is to provide an error correction circuit which, if decoding errors occur at a decoding stage, actively adjusts settings of a physical layer by utilizing an ANSI 10B/8B decoder and performs data correction by means of digital logic circuitry, thus improving the reliability of input data.

To achieve the above-mentioned object, the error correction circuit which is applied to a digital display interface Sink device performs an error correction operation at a decoding stage, comprising: at least one converting circuit and a microprocessor. Each converting circuit comprises: an equalizer for amplifying an differential signal and generating an amplified signal; a clock data recovery circuit for receiving the amplified signal and generating a recovered data; a serial to parallel converter for performing serial to parallel conversion on the recovered data and generating a parallel data; and, a decoder for receiving the parallel data and generating a decoded data, a decoding control signal, a decoding error signal or selected combinations thereof. The microprocessor receives the decoding error signal and adjusts the equalizer, the clock data recovery circuit or both if a number of decoding errors of the decoding error signal is greater than a threshold value within a predetermined period of time.

Another object of the invention is to provide an error correction correction method which is applied to a digital display interface Sink device and performs an error correction operation at a decoding stage. The method comprising the steps of: determining whether a number of decoding errors of a decoding error signal is greater than a threshold value within a predetermined period of time; and, adjusting a setting value to set a physical layer while the number of decoding errors is greater than the threshold value.

Still another object of the invention is to provide an error correction method which is applied to a digital display interface Sink device and performs an error correction operation at a decoding stage. The method comprises the steps of: determining whether a number of decoding errors of a decoding error signal is greater than a threshold value within a predetermined period of time; and, correcting one or a plurality of corresponding signals according to the decoding error signal while the number of decoding errors is greater than the threshold value.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The invention will be described with reference to the accompanying drawings.

Figure 2:
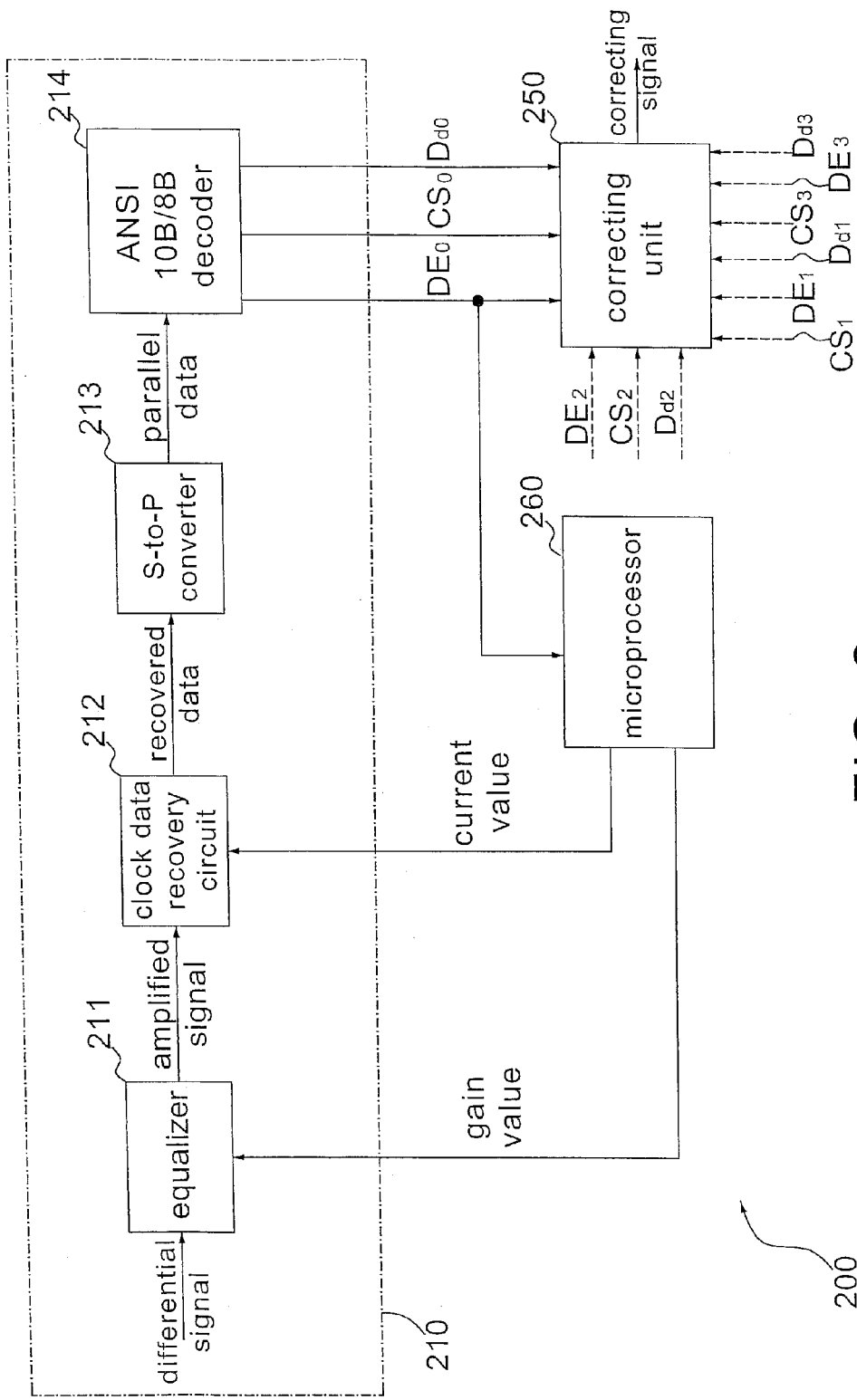
FIG. 2 is a block diagram showing an error correction circuit according to an embodiment of the invention.

FIG. 2 is a block diagram showing an error correction circuit illustrated according to an embodiment of the invention.

Referring to FIG. 2, an error correction circuit 200 for a DisplayPort receiver includes an equalizer 211, a clock data recovery (CDR) circuit 212, a serial to parallel converter 213, an ANSI 10B/8B decoder 214, a correcting unit 250 and a microprocessor 260.

A converting circuit 210 is installed in a lane $L_0$ of Main Link (a total of four converting circuits 210 would be needed if Main Link consists of four lanes). According to a gain value g, the equalizer 211 amplifies a differential signal to generate an amplified signal. The CDR circuit 212 includes a phased-locked loop (PLL) circuit (not shown) and sets a clock frequency of the PLL circuit according to a charge pump current value. The CDR circuit 212 receives and tracks the amplified signal to generate recovered data. The serial to parallel converter 213 performs a serial to parallel conversion on the recovered data to generate 10-bit parallel data. Original 8-bit data signals and 8-bit control signals are recovered from the 10-bit DC-balanced signals by the ANSI 10B/8B decoder 214 in the DisplayPort receiver. The ANSI 10B/8B decoder 214 receives and decodes the 10-bit parallel data to generate a decoding error signal $DE_0$, decoding data $D_{d0}$ and a decoding control signal $CS_0$.

Here, both the decoding data $D_{d0}$ and the decoding control signal $CS_0$ are 8-bit. As long as certain number of bytes in either the decoding data $D_{d0}$ or the decoding control signal $CS_0$ are corrupted and thus unable to be decoded correctly during transmission, the ANSI 10B/8B decoder 214 will generate a corresponding decoding error signal $DE_0$ (e.g., the decoding error signal $DE_0$ may be at a low voltage level during normal conditions and at a high voltage level when decoding results are deemed to be incorrect).

Figure 3:
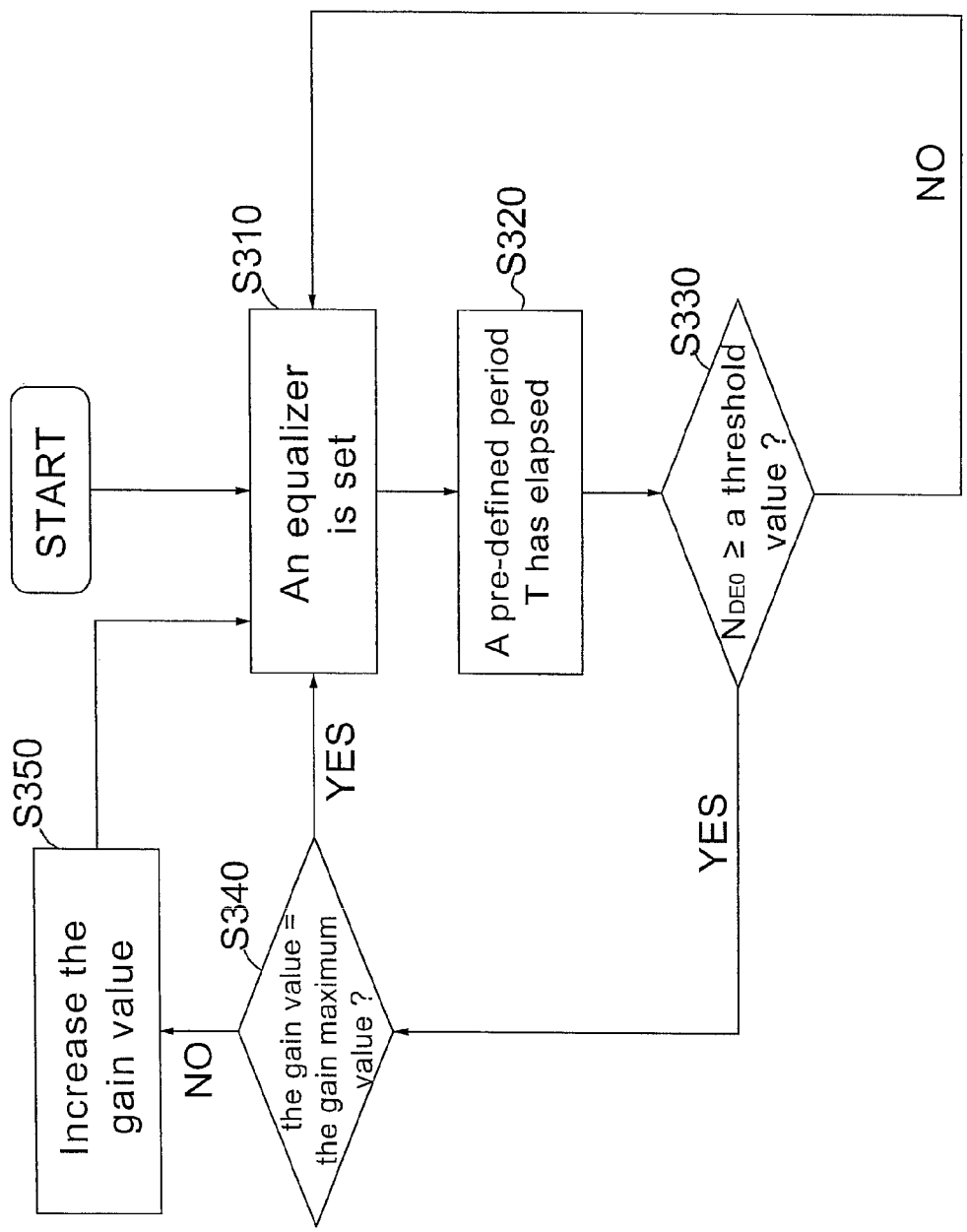
FIG. 3 is a flow chart illustrating how the strength of an equalizer is adjusted to reduce the number of decoding errors

If decoding errors occur frequently (a number $N_{DE0}$ of decoding errors is greater than a threshold value during a predetermined period), the microprocessor 260 will try to fix the frequently-occurring decoding errors by readjusting the settings of the physical layer (For example, the strength of the equalizer 211 is adjusted by varying the gain value, and the tracking capability or the clock frequency of the CDR circuit 212 may be adjusted by varying the charge pump current value). Hereinafter, FIGS. 2 and 3 describe how the strength of the equalizer is adjusted to fix the frequently-occurring decoding errors, and the converting circuit 210 in lane $L_0$ is being taken as an example.

Step S310: Operating normally, the error correcting circuit 200 sets the equalizer 211 by using a gain value (may be equal to a gain minimum value).

Step S320: A predetermined period T has elapsed, such as 1 ms.

Step S330: According to a decoding error signal $DE_0$, the microprocessor 260 determines whether the number $N_{DE0}$ of decoding errors is greater than a threshold value. If YES, the flow advances to the step S340; otherwise, it indicates that the number $N_{DE0}$ lies within the range of tolerance. Thus, the current gain value g is retained and the flow returns to the step S310.

Step S340: Determine whether the current gain value g is equal to a gain maximum value. If YES, the flow returns to the step S310; otherwise, the flow advances to the step S350.

Step S350: The current gain value g is increased by a unit (for example, g=g+1) and then used to set the equalizer 211. Afterward, the flow returns to the step S310.

In general, the microprocessor 260 increases the gain value g from the minimum value to the maximum value and then observes corresponding variations in the measured number $N_{DE0}$ of decoding errors. As long as the number $N_{DE0}$ of decoding errors falls below the threshold value, it proves successful in adjusting the equalizer and then the loop is exited. On the contrary, if the gain value g is increased from the minimum to the maximum and the number $N_{DE0}$ of decoding errors remains in a sense that nothing is improving, adjusting the equalizer would represent a failure. At this moment, by turning to the adjustment of the CDR circuit 212 is well worth a try. A method of adjusting the charge pump current value for reducing frequently-occurring decoding errors is similar to the method of FIG. 3 and thus will not be described herein.

During the process of adjusting the settings of the physical layer, layer, the worst case is that the number $N_{DE}$ of decoding errors does not reduce and is still greater than the threshold value even though both the gain value and the charge pump value have been adjusted from the minimum to the maximum. This indicates the adjustment is beyond the hardware capability of the physical layer and apparently the signal itself is incorrect. Accordingly, users may debug the transmitter or check the channel status to identify where the problem is.

However, the above-mentioned physical layer adjusting mechanism is unable to recover the data or the control signals that have decoding errors that are already generated. A correcting unit 250 is necessary for recovering the data or the control signals that have the decoding errors, thus reducing the adverse effects as far as possible. Depending on the number of lanes of Main Link, the correcting unit 250 may receive one to four sets of output signals (including a decoding error signal, decoding data and a decoding control signal) of the converting circuits 210 to generate at least one correcting signal. Here, the correcting signal includes a correcting control signal, a correcting data or combinations thereof. The operations of the correcting unit 250 will be described as follows.

Figure 4:
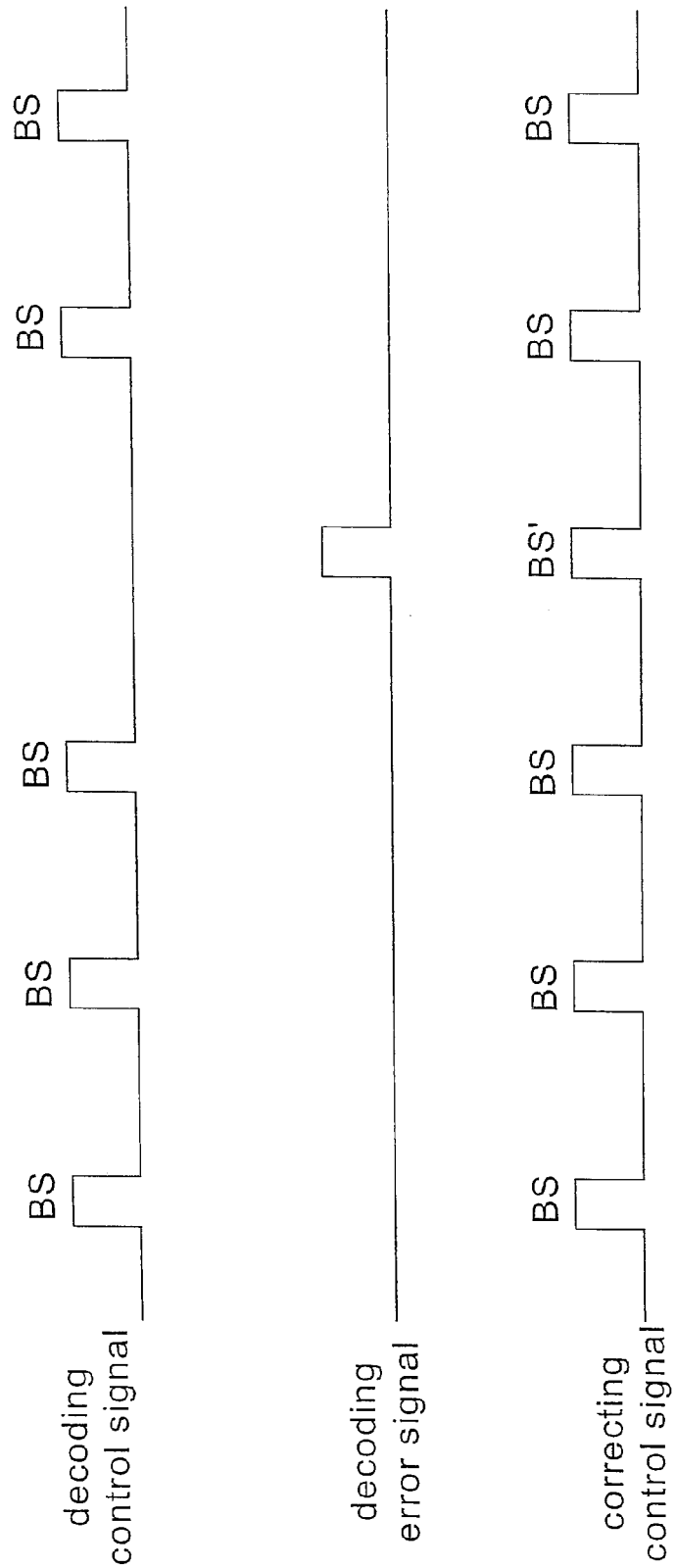
FIG. 4 is a timing diagram showing the timing relationship of a decoding control signal, a decoding error signal and a correcting control signal.

On condition that Main Link includes one lane only, referring to to FIGS. 2 and 4, most of its control signals, such as the blanking start signal BS, the blanking end signal BE and the signal VB_ID (since DisplayPort defines numerous control signals, only the blanking start signal BS of FIG. 4 is currently taken as an example), are periodically generated. Whenever the blanking start signal BS is supposed to be present but appears to be absent along with a decoding error (i.e., the decoding error signal at a high voltage level) generated by the ANSI 10B/8B decoder 214, the correcting unit 250 will actively recover the blanking start signal BS. That is, the correcting unit 250 will insert a blanking start signal BS' (e.g., signal at a high voltage level) in the corresponding location of the correcting control signal as shown in FIG. 4, in which the blanking start signal BS is previously absent.

In a scenario that Main Link includes more than two lanes, a converting circuit 210 is installed in each lane and output signals of all converting circuits are transmitted to the same correcting unit 250. Take a Main Link including four lanes as an example. An error correcting circuit (not shown) of the invention may include four converting circuits 210, a microprocessor 260 and a correcting unit 250. Here, the correcting unit 250 receives four sets of output signals of four converting circuits, including decoding error signals $DE_0$~$DE_3$, decoding data $D_{d0}$~$Dd_3$ and decoding control signals $CS_0$~$CS_3$.

Figure 1:
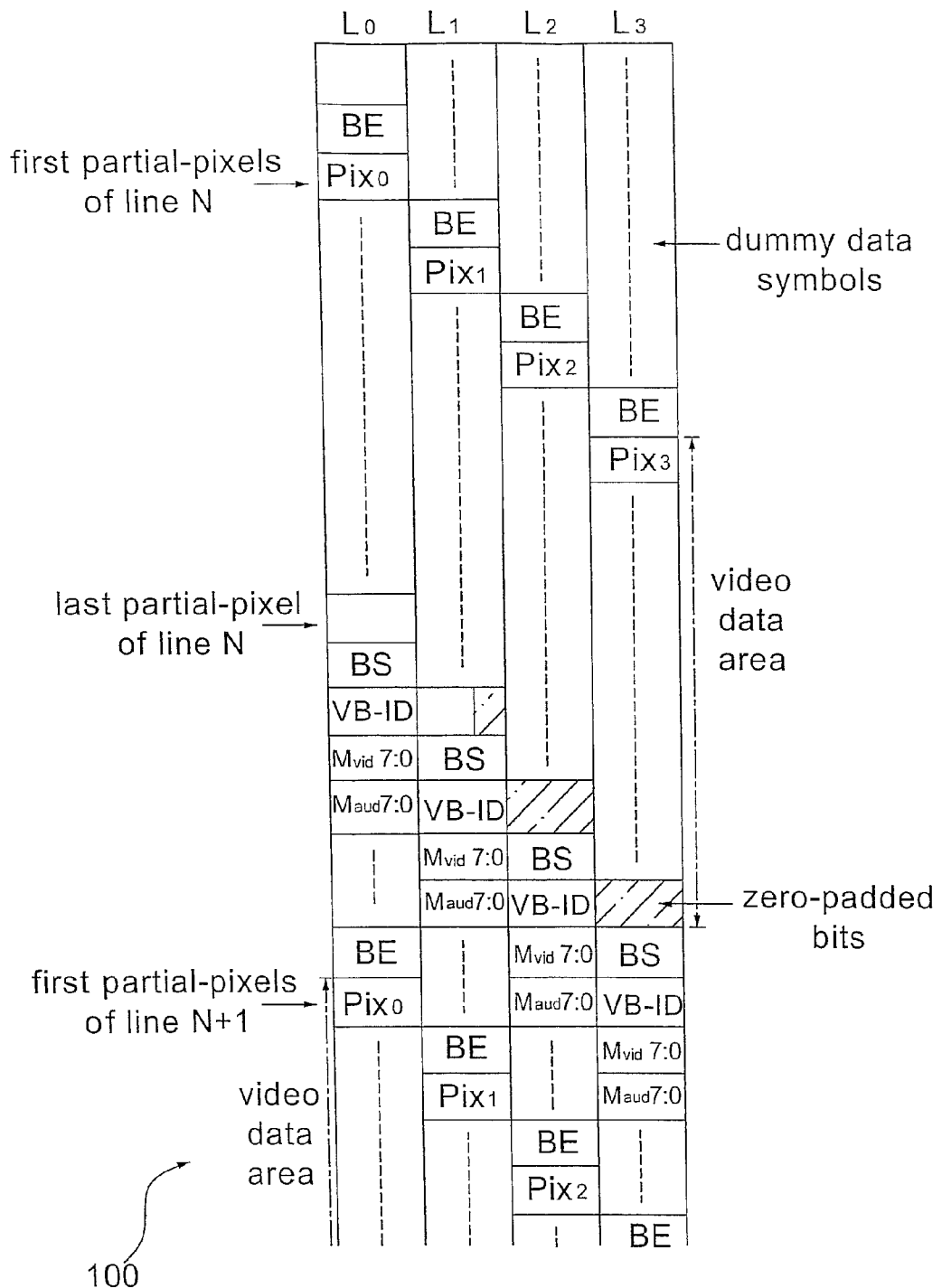
FIG. 1 is an example showing a main video stream data packing over 4-lane Main Link.

Since conventional DisplayPort transmitters perform an inter-lane inter-lane skewing (as shown in FIG. 1), control signals (such as the blanking start signal BS and the blanking end signal BE) on each lane are skewed to each other so as to prevent the same control signals on each lane from being damaged simultaneously if an unpredictable situation occurs at a certain moment. On condition that Main Link includes four lanes, after receiving four sets of the decoding error signals $DE_0 \sim DE_3$, the decoding data $D_{d0} \sim Dd_3$ and the decoding control signals $CS_0 \sim CS_3$, the correcting units 250 performs inter-lane de-skewing and simultaneously compares four sets of the decoding data $D_{d0} \sim D_{d3}$ and four sets of the decoding control signals $CS_0 \sim CS_3$. During the comparing process, assuming that at a time point $t_0$, three sets of decoding control signals $CS_0 \sim CS_2$ contain a blanking start signal BS but the set of decoding control signal $CS_3$ doesn't, and that a decoding error occurs simultaneously while the ANSI 10B/8B decoder 214 produces the set of the decoding control signal $CS_3$, the correcting unit 250 will recover a corresponding blanking start signal BS in the set of the decoding control signal $CS_3$ according to the blanking start signals BS in the other three sets of decoding control signals $CS_0 \sim CS_2$.

Figure 5:
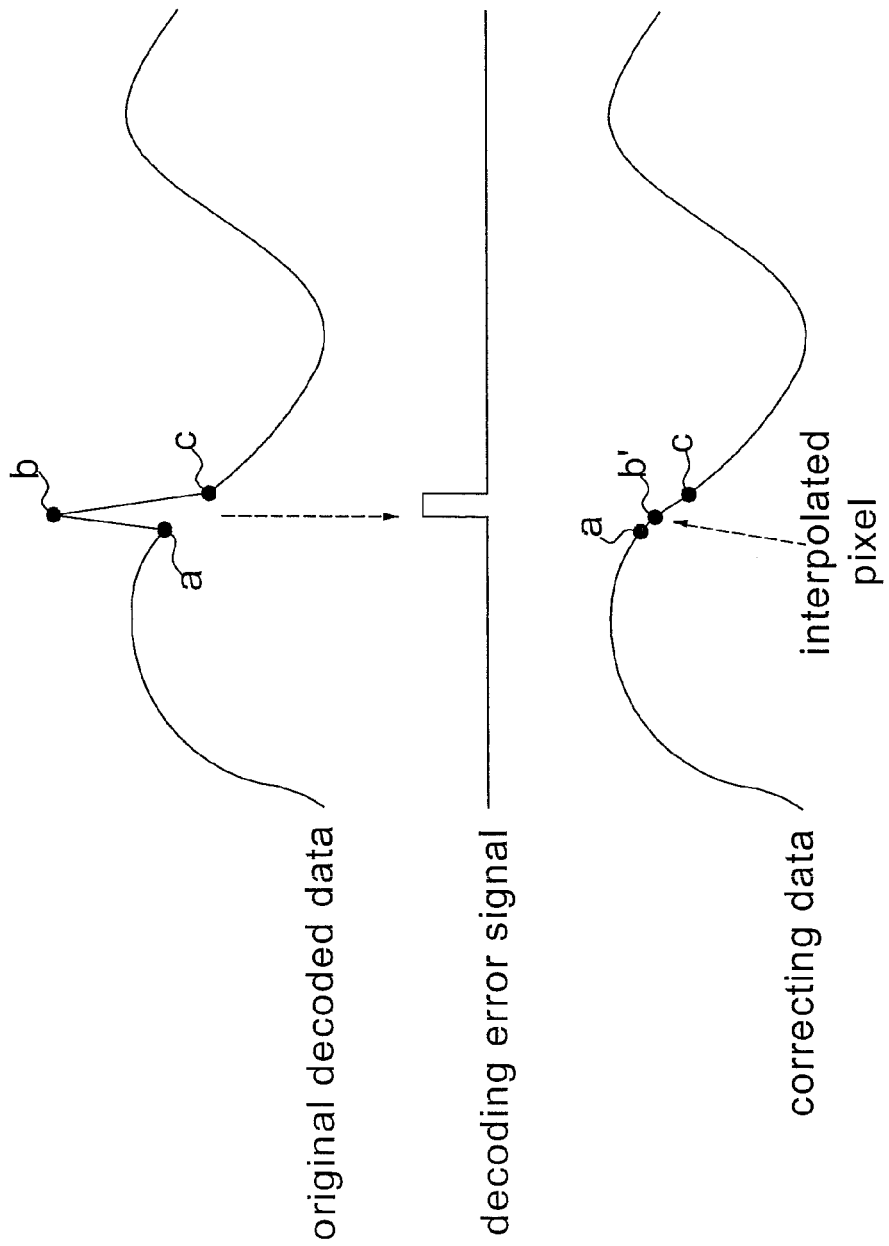
FIG. 5 is a timing diagram showing original decoded data, a decoding error signal and correcting data.

On the other hand, if a decoding error occurs in the video data area, referring to FIG. 5, the correcting units 250 will abandon a pixel value b of the original decoded data and derive a new pixel value b' from its neighboring pixel values a, c. For example, the new pixel value b' is obtained by either passing pixel values a, c through a low-pass filter or performing an interpolation operation on the pixel values a, c. Likewise, the correcting units 250 adopts the same method if the decoding error occurs in the audio data area.

Figure 6:
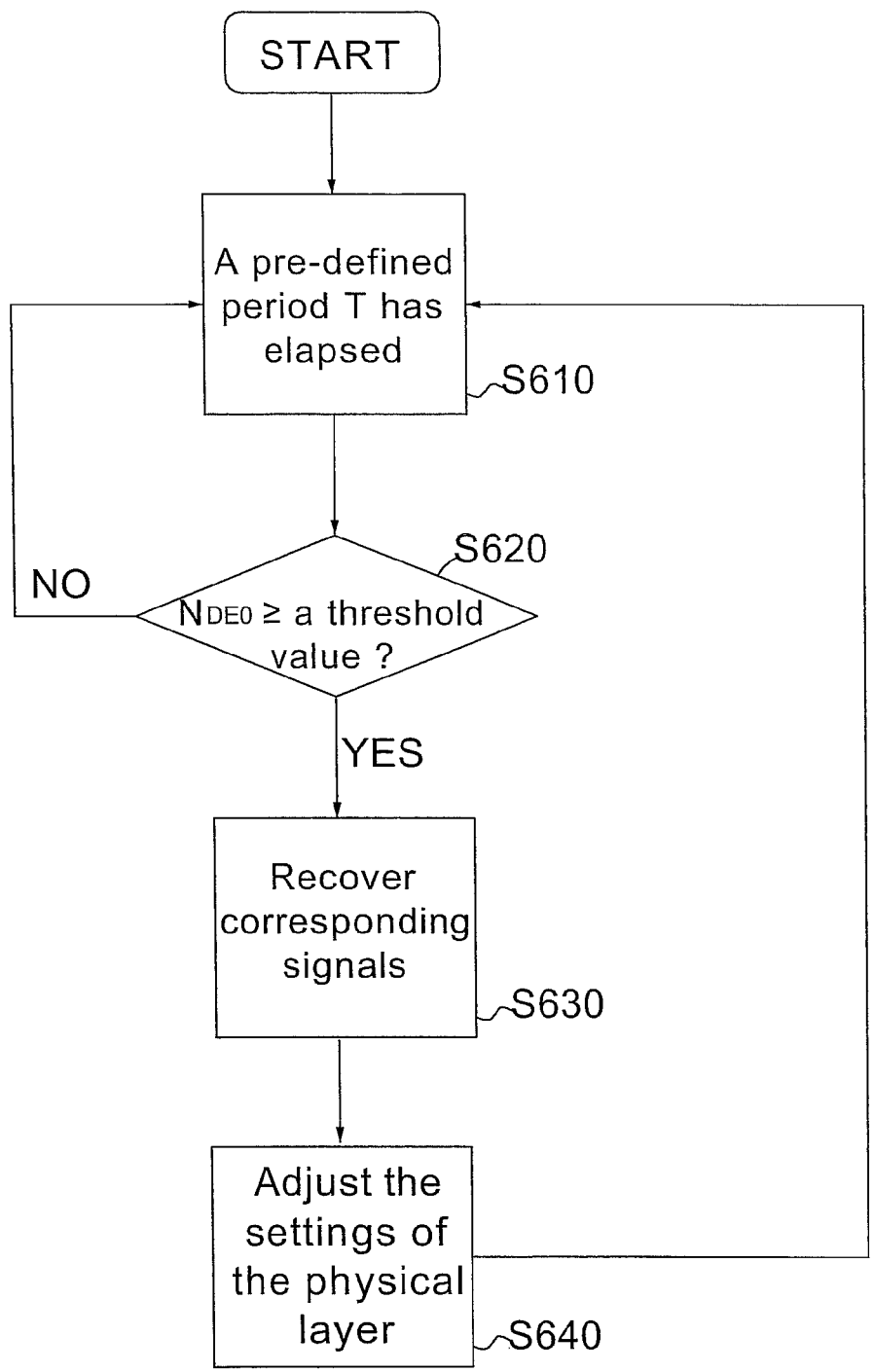
FIG. 6 is a flow chart illustrating a method of error correction of the invention.

FIG. 6 is a flow chart illustrating a method of error correction of the invention. A method of error correction for DisplayPort receivers will be described in detail in accordance with FIGS. 2 and 6.

Step S610: The error correcting circuit 200 operates normally and a predetermined period T has elapsed.

Step S620: According to the decoding error signal $DE_0$ (or $DE_1$, or $DE_2$, or $DE_3$), the microprocessor 260 determines whether the number$N_{DE0}$(or $N_{DE1}$, or $N_{DE2}$, or $N_{DE3}$) of decoding errors is greater than a threshold value. If YES, the flow advances to the step S630; otherwise, it indicates that the number $N_{DE0}$ (or $N_{DE1}$, or $N_{DE2}$, or $N_{DE3}$) of decoding errors lies in the range of tolerance and then the flow returns to the step S610.

Step S630: If the number $N_{DE0}$ (or $N_{DE1}$, or $N_{DE2}$, or $N_{DE3}$) is greater than the threshold value, the correcting unit 250 receives the decoding error signal $DE_0$ (or $DE_0 \sim DE_3$), the decoded data $D_{d0}$ (or $D_{d0} \sim Dd_3$) and the decoding control signal $CS_0$ (or $CS_0 \sim CS_3$) so as to recover control signals, audio signals and video signals correspondingly. Then, the flow advances to the step S640.

Step S640: If the number $N_{DE0}$ (or $N_{DE1}$, or $N_{DE2}$, or $N_{DE3}$) is greater than the threshold value, the microprocessor 260 adjusts the settings of the physical layer and the flow returns to the step S610.

It should be noted that, if the number $N_{DE0}$ (or $N_{DE1}$, or $N_{DE2}$, or $N_{DE2}$ or $N_{DE3}$) is greater than a threshold value, two approaches have been adopted simultaneously in the flow chart of FIG. 6. The first approach is to recover the data or the control signals having generated errors (step S630) as far as possible. The second approach is to improve the quality of the subsequent input signals (step S640), which can be achieved by adjusting the settings of the physical layer in the receivers. However, if a poor input signal quality is caused by a transmitter or a poor channel condition, it is hard to improve by adjusting the settings of the physical layer on the receiver side. Obviously, the method of FIG. 6 that simultaneously adopts the two different approaches achieves a significant effect on reducing the frequently-occurring decoding errors. In an alternative embodiment, even if only one of the two approaches is employed, it still provides practical help in reducing the decoding errors.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for error correction, the method comprising the steps of:
   determining whether a number of decoding errors of a decoding error signal is greater than a threshold value within a predetermined period of time;
   adjusting a setting value of a digital display interface while the number of decoding errors is greater than the threshold value during a decoding stage; and
   correcting a decoding error of a decoding control signal of a lane according to corresponding decoding control signals residing in other lanes.

2. The method according to claim 1, wherein the digital display interface is a DisplayPort interface.

3. The method according to claim 1, wherein the step of adjusting the setting value comprises:
   adjusting a gain value to set an equalizer.

4. The method according to claim 1, wherein the step of adjusting the setting value comprises:
   adjusting a charge pump current value to set a clock data recovery circuit.

5. The method according to claim 1, wherein the step of adjusting the setting value comprises:
   comparing the setting value with a predetermined maximum value; and
   raising the setting value while the setting value is less than the predetermined maximum value.

6. The method according to claim 5, wherein the step of adjusting the setting value further comprises:
   setting the setting value to be equal to the predetermined maximum value while the setting value is greater than the predetermined maximum value.

7. A method for error correction, the method comprising the steps of:
   determining whether a number of decoding errors of a decoding error signal is greater than a threshold value within a predetermined period of time: and
   correcting a decoding error of a decoding control signal of a lane according to corresponding decoding control signals residing in other lanes,
   wherein the method is applied to a digital display interface comprising a Main link with at least two lanes at a decoding stage.

8. A method for error correction, the method comprising the steps of:
   determining whether a number of decoding errors of a decoding error signal is greater than a threshold value within a predetermined period of time; and
   correcting a decoding error of a decoding control signal of a lane according to a pattern of the decoding control signal itself,
   wherein the method is applied to a digital display interface comprising a Main link with only one lane at a decoding stage.

9. The method according to claim 8, wherein the decoding control signal is a periodic signal.

10. The method according to claim 9, wherein the decoding control signal comprises a blanking start signal, a blanking end signal, a signal VB_ID signal or selected combinations thereof.

11. A method for error correction, the method comprising the steps of:
   determining whether a number of decoding errors of a decoding error signal is greater than a threshold value within a predetermined period of time; and
   correcting erroneous decoded video data signal or erroneous decoding audio data signal by interpolation or low-pass filtering,
   wherein the method is applied to a digital display interface at a decoding stage, and
   wherein the digital display interface is a DisplayPort interface.

12. An error correction circuit, comprising: at least one converting circuit, each comprising:
   an equalizer for amplifying a differential signal and generating an amplified signal;
   a clock data recovery circuit for receiving the amplified signal and generating a recovered data;
   a serial to parallel converter for generating a parallel data according to the recovered data;
   a decoder of a digital display interface for generating a decoded data, a decoding control signal, a decoding error signal or selected combinations thereof according to the parallel data;
   a microprocessor configured to adjust the equalizer, the clock data recovery circuit or both according to the decoding error signal if a number of decoding errors of the decoding error signal is greater than a threshold value within a predetermined period of time; and
   a correcting unit configured to generate a correcting control signal correcting a decoding error of the decoding control signal of a lane to corresponding decoding control signals residing in other lanes.

13. The circuit according to claim 12, wherein the digital display interface is a DisplayPort interface.

14. The circuit according to claim 12, wherein one converting circuit is installed in one lane of the digital display interface.

15. The method according to claim 7, wherein the digital display interface is a DisplayPort interface.

16. The method according to claim 8, wherein the digital display interface is a DisplayPort interface.

17. The method according to claim 1, wherein the correcting step includes correcting the decoding error of the decoding control signal of the lane according to the pattern of the decoding control signal itself, and the method is applied to a digital display interface comprising a Main link with only one lane at a decoding stage.

18. The method according to claim 1, wherein the correcting step includes correcting the decoding error of the decoding control signal of the lane according to the corresponding decoding control signals residing in the other lanes, and the method is applied to a digital display interface comprising a Main link with at least two lanes at a decoding stage.

19. The error correction circuit according to claim 12, wherein the correcting unit is configured to generate the correcting control signal correcting the decoding error of the decoding control signal of the lane according to the pattern of the decoding control signal itself, and the digital display interface comprises a Main link with only one lane at a decoding stage.

20. The error correction circuit according to claim 12, wherein the correcting unit is configured to generate the correcting control signal correcting the decoding error of the decoding control signal of the lane according to the corresponding decoding control signals residing in other the lanes, and the digital display interface comprises a Main link with at least two lanes at a decoding stage.

21. A method for error correction, the method comprising the steps of:
   determining whether a number of decoding errors of a decoding error signal is greater than a threshold value within a predetermined period of time;
   adjusting a setting value of a digital display interface while the number of decoding errors is greater than the threshold value during a decoding stage; and
   correcting a decoding error of a decoding control signal of a lane according to a pattern of the decoding control signal itself, wherein the pattern of the decoding control signal is a periodic pattern.

22. An error correction circuit, comprising:
   at least one converting circuit, each comprising:
   an equalizer for amplifying a differential signal and generating an amplified signal;
   a clock data recovery circuit for receiving the amplified signal and generating a recovered data;
   a serial to parallel converter for generating a parallel data according to the recovered data and; and
   a decoder of a digital display interface for generating a decoded data, a decoding control signal, a decoding error signal or selected combinations thereof according to the parallel data; and
   a microprocessor configured to adjust the equalizer, the clock data recovery circuit or both according to the decoding error signal if a number of decoding errors of the decoding error signal is greater than a threshold value within a predetermined period of time,
   a correcting unit configured to generate a correcting control signal correcting a decoding error of the decoding control signal of a lane according to a pattern of the decoding control signal itself, wherein the pattern of the decoding control signal is a periodic pattern.

23. The method according to claim 21, wherein the step of correcting the decoding error of the decoding control signal of the lane according to the pattern of the decoding control signal itself includes correcting the decoding error of the decoding control signal of the lane according to a missing part of the periodic pattern of the decoding control signal itself.

24. The circuit according to claim 22, wherein the correcting unit is configured to generate the correcting control signal correcting the decoding error of the decoding control signal of the lane according to a missing part of the periodic pattern of the decoding control signal itself.

* * * * *